March 7, 1961
A. P. SABOL
2,974,019
APPARATUS FOR OBTAINING NITROGEN DIOXIDE FROM NITROUS OXIDE
Original Filed March 19, 1957
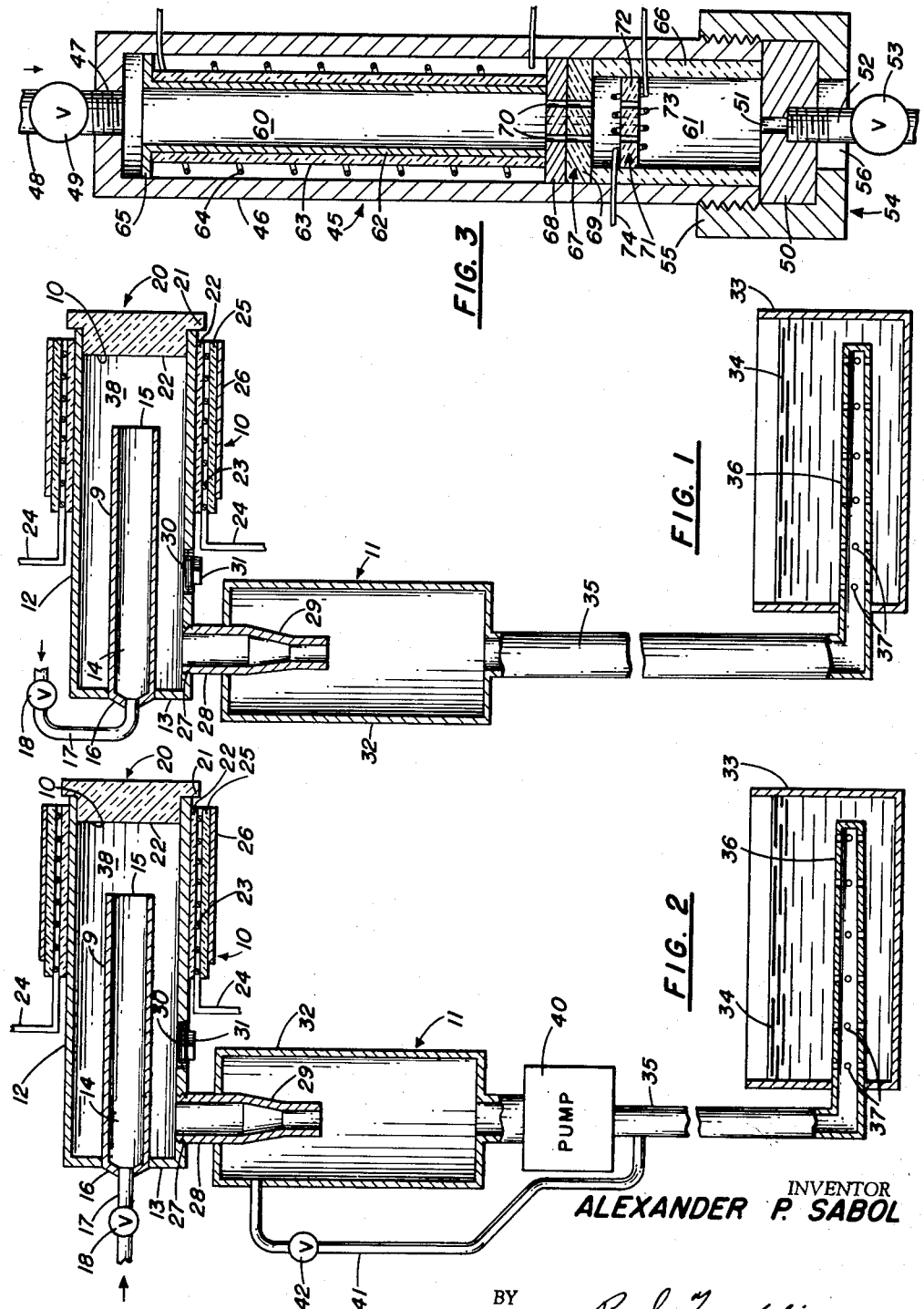
INVENTOR
ALEXANDER P. SABOL
BY
R. J. Tompkins
ATTORNEY _United States Patent Office_ 2,974,019
Patented Mar. 7, 1961

2,974,019

APPARATUS FOR OBTAINING NITROGEN DIOXIDE FROM NITROUS OXIDE

Alexander P. Sabol, Queens Lake, Rte. 2, Williamsburg, Va.

Original application Mar. 19, 1957, Ser. No. 647,168. Divided and this application July 23, 1958, Ser. No. 750,543

2 Claims. (Cl. 23—284)

(Granted under Title 35, U.S. Code (1952), sec. 266)

The invention described herein may be manufactured and used by or for the Government of the United States of America for governmental purposes without the payment of any royalties thereon or therefor.

This invention relates to a method and apparatus for obtaining nitrogen dioxide from nitrous oxide by self-sustaining thermal decomposition of the nitrous oxide, and is a division of my co-pending application Serial No. 647,168 filed March 19, 1957, which is in turn a continuation-in-part of my copending application Serial No. 466,464, filed November 2, 1954, now Patent No. 2,799,159.

Heretofore, nitrogen dioxide has been obtained continuously from nitrous oxide by passing the nitrous oxide through a straight tube heated from the outside to a temperature sufficient to bring about decomposition of the contained gas. A disadvantage of this prior method is the necessity of maintaining external heat application on the tube, due to the fact that without the external heater the continuous entry of cool nitrous oxide extinguishes the reaction.

Generally stated, this invention consists in a method for obtaining a continuous and self-sustaining thermal breakdown of nitrous oxide with production of nitrogen dioxide.

The primary object of the invention, therefore, is to provide a self-sustaining method for production of nitrogen dioxide from nitrous oxide. An object, also, is to provide a thermal decomposition method involving use of regenerative procedure to maintain operative efficiency. Another object is to provide apparatus for effective use of the method procedure. An additional object is to provide effective control of the cooling of decomposition products of nitrous oxide so that the percentage of obtained nitrogen dioxide may be modified.

Other objects and many of the attendant advantages of this invention will be readily appreciated as the same becomes better understood by reference to the following detailed description when considered in connection with the accompanying drawings wherein:

Fig. 1 is a view of an elevation of the regenerative type reactor, with parts in section;

Fig. 2 is a view similar to Fig. 1, but showing modified cooling apparatus for the derived gases; and Fig. 3 is a view, with parts in section, of a modified apparatus of the straight-flow type.

Recently published reports indicate that the manufacture of nitrogen dioxide ($NO_2$), which is a basic ingredient for nitric acid, appears to be economically feasible through direct use of atomic energy. In this process, however, large quantities of nitrous oxide ($N_2O$) are produced as a by-product for which there appears to be no large scale use.

In my experimental work pertaining to the continuous internal heating of air in a hypersonic wind tunnel by decomposition of nitrous oxide, as explained in my copending application hereinabove referred to, it was discovered that, under certain conditions of control, substantial quantities of nitrogen dioxide was formed in addition to the elemental gases $N_2$ and $O_2$, and in the figures of the drawing, apparatus effective for obtaining this decomposition is shown.

In Fig. 1 there is illustrated the regenerative type reactor 10 provided with gas cooling equipment 11 added to control the quantity of $NO_2$ produced. This figure shows an outer tube 12 made from a refractory material with low heat-conductance, for example, a ceramic such as Vycor. One end 13 of this tube is closed, except for a central opening through which a pipe 14 of smaller diameter extends for about three-fourths the outer tube length. This inner tube 14, which is also of Vycor or the like, has an open inner end 15 and at its outer end 16, external to tube end 13, it is contracted to engage a supply pipe 17 provided with control valve 18, the pipe having connection to the pressurized supply of $N_2O$. Inner tube 14, for about a half of its length inside tube 12, has a reduced outside diameter and on this reduced section a layer 9 is applied of a material possessing high refractory property, high thermal conductivity and resistance to spalling and oxidation, such as the commercial substance Carbofrax containing 85 percent or more of silicon carbide.

The end of tube 12 opposite to closed end 13, is open, and closely seated in this open end and completely closing the opening is a stopper 20 made of ceramic or asbestos board, the edge of the stopper bearing an outer annular flange 21 seating snugly against the open end of outer tube 12. The stopper 20 has pronounced thickness, so as to augment its use as a heat reservoir, and inner surface 22 is preferably roughened to enhance its use as a "flame holder" as will be described more fully hereinafter.

The outer side of the outer tube 12, for about one-half its length, adjacent the stopper, is covered by a layer 22 of heat and electricity insulating material such as asbestos tape and over this tape is wrapped a coil of electrical resistance wire 23, having terminals 24, for heating the tube. Over the wire coil a second layer 25 of insulation material is placed, and over this second insulation layer a sheet of heat conducting material 26, such as aluminum foil, is wrapped.

Adjacent the inner closed end 13 of tube 12, an opening 27 is formed having a threaded edge adapted to receive the outlet pipe 28, the latter having a tapered outlet nozzle 29 to control the flow from the reactor. The nozzle may be shifted to different points along the length of tube 12, various threaded tube openings being made for this purpose, opening 30, as closed by plug 31 which fits both openings, being indicated.

A cooling system 11 is provided to control the rate of cooling of the gas moving through outlet nozzle 29. This system basically includes a gas expansion chamber 32, a water tank 33 adapted to hold water 34, a pipe line 35 from the chamber 32 to the tank 33 and a long nozzle 36 attached to pipeline 35 and extending approximately along the entire length of and within the tank 33, adjacent the base thereof. Nozzle 36 is provided with spaced perforations 37 in the nozzle wall to permit gas emanations at multiple points within the water of the tank.

The operation of the apparatus will now be explained. Heating current is first applied to the terminals 24 of heater coil 23, whereby the decomposition chamber in tube 12, from about one-half the tube length to the stopper 20, and indicated by numeral 38, is heated to a point where the tube 12 attains a bright red color. $N_2O$, at pressures which may vary from atmospheric to about 37 atmospheres, but which have been found particularly effective at around 25 atmospheres, is then introduced through pipe 17 under control of valve 18, this gas passing through inner tube 14 and after emergence at open end 15 in the decomposition chamber 38, impinging on the stopper surface 22, where the flow is reversed, the gas being forced against the heated wall of tube 12. As a result of this wall impact, the $N_2O$ decomposes and liberates its heat of formation, the resulting pressure increase and turbulence carrying gases to surface 10 which is thus heated to a temperature sufficient to initiate decomposition of the inflowing $N_2O$ striking this surface. As soon as this temperature condition of stopper surface 10 is reached, the current is cut off from heater 23 and the process becomes self-sustaining. After leaving decomposition space 38, the heated decomposed gases move reversely in the annular space between tubes 12 and 14 to the outlet nozzle 29, this reverse movement heating inner tube 14 and, thereby, the incoming $N_2O$ gas.

The decomposition gases ejected from nozzle 29 include $NO_2$, $N_2$, $O_2$ and undecomposed $N_2O$. These gases are now cooled and $NO_2$ is recovered by bubbling the gases through water, $NO_2$ only being absorbed by the water to form nitric acid.

It has been found that the rate of exhaust gas cooling is an important factor in determining the percentage of $NO_2$ recovery, a rapid rate being usually desirable. Cooling control, in the apparatus arrangement of Fig. 1, is secured by the shape of outlet nozzle 29, the degree of contraction of the nozzle outlet being determining, by the point of placement of the nozzle along the tube 12, as at 27 or 30, for example, by the use and dimensions of expansion chamber 32, and by the rate of flow of the gas as determined by pressure conditions, the rate of gas cooling being affected by changes in each of these elements.

Additional control of cooling and, hence, of the percentage of $NO_2$ obtained in the process, is obtained by the arrangement as shown in Fig. 2. In this figure the reactor 10 is identical to the showing of Fig. 1, but the cooling equipment is modified by insertion of a pump unit 40 in the pipe line 35 between the expansion chamber 32 and water tank 33 and by connecting the pipe 35 below the pump 40 to the expansion chamber at a point near outlet nozzle 29 by means of return pipe 41, valve 42 controlling the return flow of cooled pump pressurized gases. This cooling may be further increased by inserting either in the expansion chamber or in the pipe line between pump and water tank a nest of tubes which may be similar to an automobile radiator through which cooling liquid may be transmitted and between which the hot gases may flow.

These features of importance characterize the apparatus of Figs. 1 and 2, the self-sustaining action of the decomposition which proceeds without need of external heat application, the regenerative heat action wherein the inflowing $N_2O$ gas is preheated by the heated decomposed reversely flowing gases, and the effective control over cooling of the heated gases, whereby the percentage of derived $NO_2$ is determined.

In Fig. 3, a modification of the invention is illustrated showing an efficient single pass reactor 45 which may be inserted in the reactor-cooler combination of Fig. 1 or 2. In this reactor, an elongated main metal tube 46, which may be of steel, is employed, the tube being closed at one end, except for central opening 47, and open at the other end. An inlet pipe 48 has screw-threaded engagement with central opening 47, a valve 49 controlling the flow of $N_2O$ gas into tube 46.

At the open end of the tube 46 is a stopper 50, this stopper being centrally apertured to form an outlet or orifice 51, an outlet pipe 52, having a control valve 53 therein, being connected, as by screw threads, to an enlarged section of this orifice. A cap 54, with an annular internally threaded depending skirt 55 engages the threaded surface on the outer open end of tube 46, serving to forcibly draw the stopper 50 against the open end of tube 46. Centrally of the cap an opening 56 is formed to provide entry space for the outlet pipe 52.

Tube 46 is divided into two sections: a preheater section 60 and a decomposition chamber section 61. The preheater section 60 consists of metal tube 62, which may be of brass, for example, about which is wrapped a layer of asbestos tape 63, and about the tape a coil is wound of electrical resistance wire, forming a heater 64. One end of the metal tube carries an outer flange 65 and the tube tape heater unit is positioned in the outer tube 46 with the flange edge snugly engaging the inner wall surface thereof adjacent the inlet end.

The decomposition chamber section 61 is placed at the outlet end of tube 46 and includes an open ended cylindrical liner 66 of refractory ceramic or brick abutting the stopper 50 and extending to about one-third the length of the main tube 46. Separating the liner 66 and the end of preheater tube 62 is a barrier unit 67 consisting of two transverse adjoining disks 68 and 69, the disk 68 being of supporting metal and the disk 69 of heat insulating material, such as Transite. As indicated, these two disks are formed with multiple alined perforations or apertures 70 for conducting $N_2O$ gas from the preheater section 60 to the decomposition chamber 61. Toward the barrier plates but displaced therefrom is a heater unit which may be termed an initiator 71. This unit is formed of a disk 72 of pressed mica or ceramic about one-quarter inch in thickness, around which is wound an electrically heating wire 73, such as Nichrome, the wire having terminals 74 and being in sections to clear the various perforations 75. It is pointed out that the barrier 67 serves the triple function of separating the preheater and decomposition sections of the reactor, preventing flash back into the preheating section below and also by means of the multiple apertures 70, directing the preheated $N_2O$ directly against the initiator unit.

In using the modified structure of Fig. 3, the stopper 50 with its fixed orifice 51 may be exchanged for other stoppers of different orifice dimensions to control the rate of flow.

In the operation of the straight pass type of reactor, $N_2O$ gas is introduced into the preheater section from inlet pipe 48 as controlled by valve 49, and is preheated by coil 64 in the preheater section to a temperature approaching but below the decomposition value, the gas then passing through the barrier apertures and striking the initiator which has previously been heated by wire 73. The initiator carries the temperature above the decomposition value and brings about decomposition of the gas, the liberated heat maintaining the initiator structure at this break down temperature and permitting deenergization of both preheater and initiator coils. Thus, the reaction becomes self-sustaining. The decomposed gases escape through outlet orifice 51 into the outlet pipe 52 and are cooled by either of the methods indicated in Figs. 1 and 2. In a typical run, chemical analysis indicated the presence of $N_2$—56.5%, $O_2$—16.8%, $NO_2$—15.2% and the balance undecomposed $N_2O$—11.7. For this run, the gas pressure in the reactor was 25.5 atmospheres, the preheat temperature 586° K., the maximum temperature 1692° K. and the flow rate 2.36 grams per second. It is apparent, however, that their values are subject to considerable variation, the essential conditions being a preheater temperature below the decomposition temperature, the initiator temperature at or above the decomposition temperature, and pressure conditions such as to produce a pronounced flow of the gases.

While the apparatus, as above described, is intended primarily for a continuously maintained production of $NO_2$, it is apparent that it may be readily applied to any gaseous exothermic compound wherein the heat of decomposition is sufficient to maintain a heat reservoir at or above this heat.

Obviously many modifications and variations of the present invention are possible in the light of the above

What is claimed is:

1. A reactor for obtaining self-sustaining exothermic decomposition of a gaseous compound comprising a decomposition chamber, a gas inflow tube connected to said chamber and providing access thereto, supply means connected to said inflow tube for passing a continuous flow of said gaseous compound under pressure through said tube and chamber, heat reservoir means in said chamber located in the path of flow of said gaseous compound under pressure passing from said inflow tube, means located in physical contiguity with said chamber for initiating said exothermic decomposition and for heating said gasous compound and said heat reservoir means, said heat reservoir means being heated above the decomposition temperature of said gaseous compound by said initial exothermic decomposition whereby said gaseous compound continuously entering said chamber is heated above its temperature of decomposition by said heat reservoir means, an expansion cooling chamber, conduit means interconnecting said decomposition chamber and expansion cooling chamber, an outlet pipe connected to said expansion chamber, means for pumping gases from said expansion chamber through said outlet pipe, a return pipe connecting said outlet pipe with said expansion chamber, and a valve positioned in said return pipe for controlling the rate of gas flow therethrough.

2. A reactor for obtaining self-sustaining production of nitrogen dioxide from nitrous oxide comprising a decomposition chamber, a gas inflow tube penetrating one wall of said chamber and protruding therein substantially along the longitudinal axis of said chamber extending for more than one-half the length of said chamber and terminating with an open inner end, supply means connected to said inflow tube for passing a continuous flow of said nitrous oxide through said tube and chamber, means solely for initiating said exothermic decomposition surrounding said chamber and in contact therewith, heat reservoir means located beyond said open end of said inlet tube with that portion of the chamber located generally between said end of said tube and said heat reservoir means comprising a zone of decomposition, outlet conduit means penetrating a wall of said chamber adjacent the supply end of said inlet tube for removing decomposition products whereby after initiation of said exothermic decomposition in said zone of decomposition with consequent heating of said heat reservoir the nitrous oxide which subsequently continuously enters said chamber via said inlet tube is preheated in said inlet tube by the hot products of decomposition flowing around said tube towards said outlet means whereby after leaving said inlet tube said nitrous oxide is heated above the temperature of decomposition by said heat reservoir, an expansion chamber, conduit means connecting said outlet means with said expansion chamber, on outlet pipe connected to said expansion chamber, means for pumping cooled gases from said expansion chamber through said outlet pipe, a return pipe connecting said outlet pipe to said expansion chamber, and a valve positioned in said return pipe for controlling the rate of gas flow therethrough.

References Cited in the file of this patent

UNITED STATES PATENTS

| | | |
|---|---|---|
| 873,891 | Pauling | Dec. 17, 1907 |
| 1,864,541 | Hernmann | June 28, 1932 |
| 2,620,259 | McKinnis | Dec. 2, 1952 |